US011808257B2

(12) United States Patent
Miller et al.

(10) Patent No.: US 11,808,257 B2
(45) Date of Patent: Nov. 7, 2023

(54) CORDLESS COMPRESSOR

(71) Applicant: BLACK & DECKER INC., New Britain, CT (US)

(72) Inventors: Kathleen A Miller, Baltimore, MD (US); Michael S. Justis, Towson, MD (US); Michael J. Kowalski, Towson, MD (US); Steven Thomas Carpenter, Parkville, MD (US); Raghavendra Byatnal, Cockeysville, MD (US); Philip John Martinez, Red Lion, PA (US); Jared W. Rondeau, Colchester, CT (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 17/231,148

(22) Filed: Apr. 15, 2021

(65) Prior Publication Data

US 2022/0333593 A1 Oct. 20, 2022

(51) Int. Cl.

| | |
|---|---|
| ***F04B 49/02*** | (2006.01) |
| ***F04B 35/04*** | (2006.01) |
| ***F04B 41/02*** | (2006.01) |
| ***F04B 35/06*** | (2006.01) |
| ***B60S 5/04*** | (2006.01) |

(52) U.S. Cl.

CPC ............ *F04B 49/022* (2013.01); *B60S 5/046* (2013.01); *F04B 35/04* (2013.01); *F04B 35/06* (2013.01); *F04B 41/02* (2013.01)

(58) Field of Classification Search

CPC .......... F04B 9/022; F04B 41/02; F04B 35/04; F04B 35/06; B60S 5/046

See application file for complete search history.

(56) References Cited

U.S. PATENT DOCUMENTS

| | | | | |
|---|---|---|---|---|
| 7,494,035 | B2 | 2/2009 | Weaver et al. | |
| 7,886,553 | B2 * | 2/2011 | Joergensen ........... | H02J 7/1461 323/299 |
| 8,718,848 | B2 * | 5/2014 | Pfefferl ................... | F04C 28/06 701/22 |
| 10,006,450 | B2 | 6/2018 | Nishido et al. | |
| 2002/0158102 | A1 | 10/2002 | Patton et al. | |
| 2006/0104836 | A1 | 5/2006 | Phillips | |

(Continued)

FOREIGN PATENT DOCUMENTS

| | | | |
|---|---|---|---|
| EP | 1893871 | A1 | 3/2008 |
| EP | 2597309 | B1 | 4/2018 |
| WO | 2007116239 | A1 | 10/2007 |

OTHER PUBLICATIONS

European Search Report dated Jul. 25, 2022 cited in corresponding EP Application No. 22166618.3.

(Continued)

*Primary Examiner* — Christopher S Bobish

(74) *Attorney, Agent, or Firm* — Adan Ayala

(57) ABSTRACT

A cordless compressor has an air storage tank, a pump, a motor for driving the pump, and a controller circuit electrically connected to the motor. A pressure switch assembly is connected to the controller circuit. The pressure switch assembly has first and second pressure switches for sensing pressure within the air storage tank. The controller circuit controls de-activation of the motor depending upon status of the first and second pressure switches.

5 Claims, 2 Drawing Sheets

(56) References Cited

U.S. PATENT DOCUMENTS

| | | | | |
|---|---|---|---|---|
| 2007/0059186 | A1 | 3/2007 | Weaver et al. | |
| 2008/0181794 | A1* | 7/2008 | Steinfels | F04B 35/06 417/234 |
| 2010/0290929 | A1 | 11/2010 | Ohi et al. | |
| 2019/0120222 | A1 | 4/2019 | Hathcock et al. | |
| 2019/0263363 | A1 | 8/2019 | Mcintyre et al. | |
| 2019/0288307 | A1 | 9/2019 | Kim et al. | |
| 2021/0079904 | A1* | 3/2021 | Nemeth | B60T 17/02 |

OTHER PUBLICATIONS

Korean Office Action dated Aug. 23, 2022 cited in corresponding KR Patent Application No. 10-2019-7022281.

* cited by examiner

CORDLESS COMPRESSOR

FIELD

The present invention relates in general to the field of air compressors and particularly to air compressors powered by battery packs.

BACKGROUND

A compressor assembly typically includes a compressor mounted to a compressed air storage tank, an electric motor driving the compressor and an air discharge tube connected to the compressor and the air storage tank. The air storage tank provides a tank or receiver for storing a fluid, such as air, under pressure.

The compressor unit typically includes a piston assembly, or compressor pump, which compresses the fluid and forces it into the fluid pressure tank for temporary storage.

Likewise, an air compressor assembly provides a source of pressurized air to an air storage tank. Many portable air compressors include a compressor mounted to an air storage tank. The compressor compresses air which is then stored in the air storage tank. The compressor unit compresses air from the atmosphere. The pressurized air in the air storage tank can be used for operating air powered tools such as nailing tools, socket driving tools, material shaping tools, sanding tools, spray painting tools, inflation chucks, and inflating tires and the like.

Typically, the electric motor is an AC motor, requiring the air compressor assembly to be connected to an AC power source. However, a compressor with an AC motor cannot be used in places that do not have AC power or a nearby AC outlet.

Accordingly, some prior art solutions substitute the AC motor with a DC motor that can be powered from a battery pack. However, compressors typically have a (relatively) high energy demand. For example, a 4 (four) gallon compressor operating at in the range of 135 psi to 150 psi (pounds per square inch) may require in the range of 10-15 amps in order to compress the air sufficiently to operate a pneumatic device such as a pneumatic fastener, an impact wrench and the like. Therefore, the compressor must pressurize a sufficient quantity of air to at least a minimum operating pressure in order for the pneumatic device to operate properly. For instance, a brad nailer typically requires a much smaller quantity of air to drive a brad nail than is required for a framing nailer to drive a large nail such as a 16 d (sixteen penny nail). As a result, a pressure tank is typically included to store a sufficient quantity of air in order to meet a user's short term demand (e.g., a few shots of a pneumatic fastener in quick succession, a burst from an impact wrench sufficient to secure a lug nut), thereby allowing the compressor pump to "catch-up", or making no demand on the compressor pump. While the compressor usually is configured to handle a temporary demand of the type described above, the additional compressed air stored in a tank is usually surplus of air which may never be effectively utilized. In the foregoing situation, the compressor pump may expend a (relatively) large amount of energy in order to pressurize the air, in comparison to the energy expended to pressurize the air which is utilized to operate the pneumatically power device or attachment.

Therefore, it would be desirable to provide a compressor capable of utilization in environments lacking an electrical supply while providing a suitable airflow without the drawbacks previously experienced.

DESCRIPTION OF THE DRAWINGS

Preferred embodiments of the invention will now be described, by way of example, with reference to the accompanying drawings, of which:

FIGS. 1-2 are perspective and rear views of the compressor assembly, respectively.

DETAILED DESCRIPTION

Figure 1:
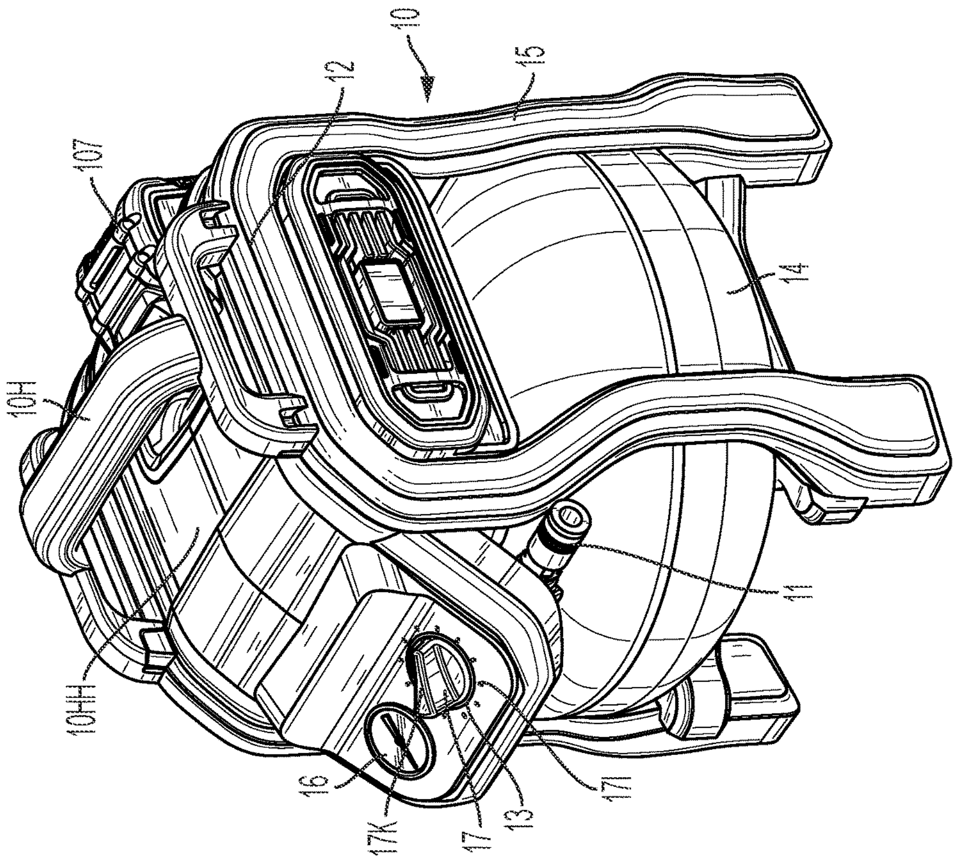
FIG. 1 and FIG. 2 illustrate a compressor assembly, where
Figure 2:
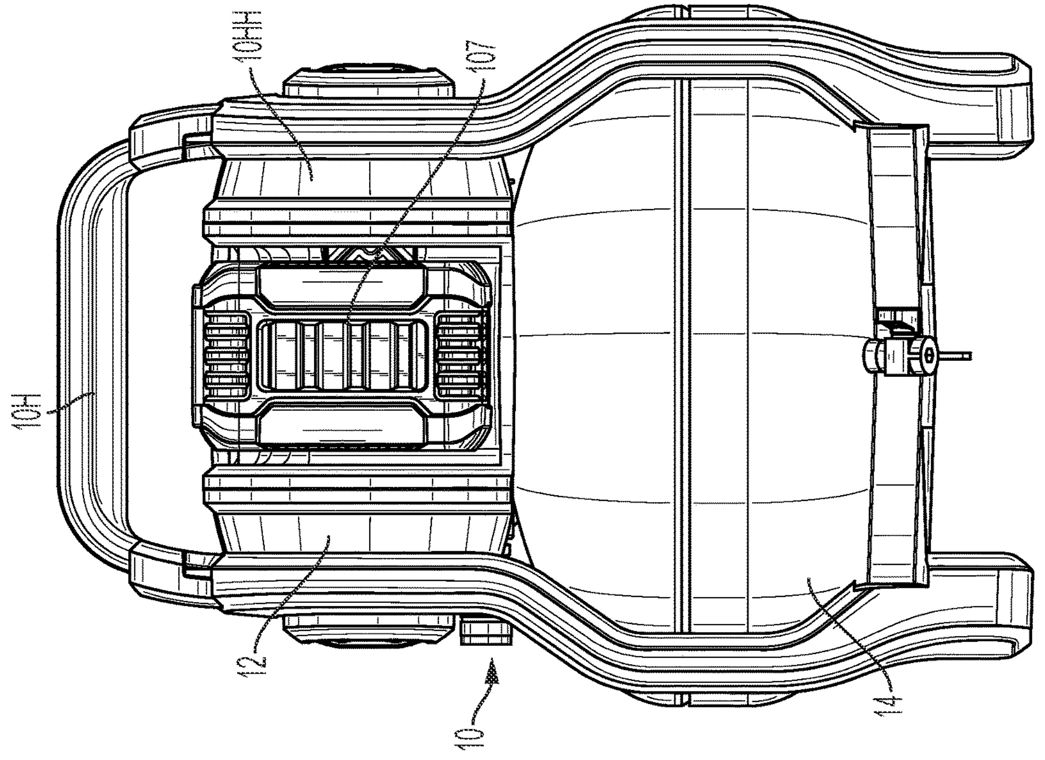

Referring generally to FIGS. 1-2, an air compressor assembly 10 in accordance with an exemplary embodiment of the present invention is described. The air compressor assembly 10 may be configured for utilization with a small demand fastener (a fastener requiring a small quantity of compressed air to operate) such as a finish nailer, or brad nailer. Persons skilled in the art are referred to U.S. application Ser. No. 16/130,383, filed on Sep. 13, 2018, entitled CORDLESS COMPRESSOR, which is hereby incorporated in full by reference.

Figure 3:
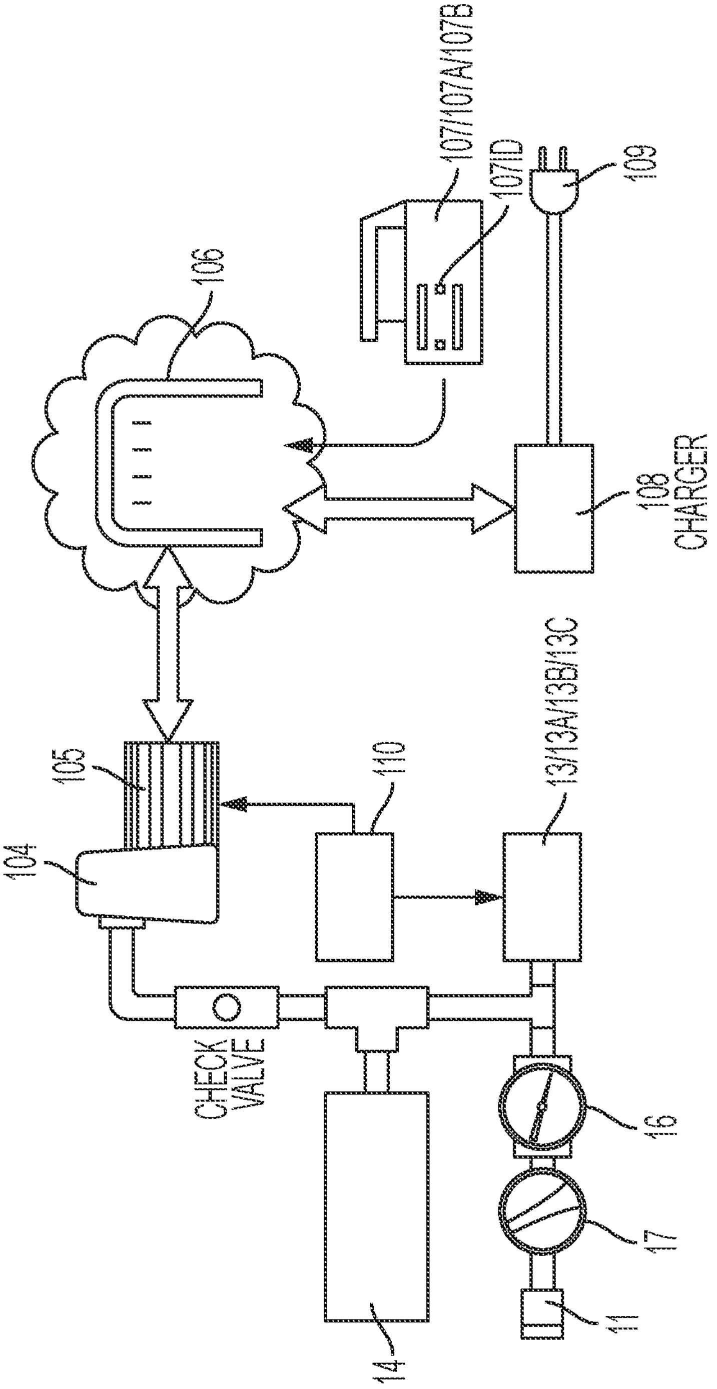
FIG. 3 is a diagrammatic layout of the compressor assembly of FIGS. 1-2.

As shown in FIGS. 1-3, the air compressor assembly 10 includes a compressor 12 mounted to a compressed air storage tank 14. Compressor 12 may include a pump 104 for generating a supply of compressed air. For instance, pump 104 may generate about 90 psi (ninety pounds per square inch) air supply with about 0.75-1.3 SCFM (cubic feet per minute at standard conditions) capacity. Pump 104 may have an inertia disk. Persons skilled in the art are referred to US Publication No. 2006/0104836, entitled "Cordless Compressor," which is hereby fully incorporated by reference, for further information on the elements of compressor 12.

Preferably pump 104 is selected so that it can have a maximum time from the time it is turned on (with a pressure of 0 psi) to the time it reaches a preset high pressure point, or "kick-out pressure," of about 135 psi in less than 135 seconds.

Air compressor assembly 10 preferably includes a motor 105 coupled to the pump 104 for driving the pump 104. Pump 104 is preferably connected to the air storage tank 14.

The air storage tank 14 provides a tank or receiver for storing a fluid, such as air, under pressure. Preferably the air storage tank 14 may be comprised of a flattened oval or "pancake" style tank of about 2-2.5 gallons.

The air compressor assembly 10 is preferably sized to allow for hand transport by a single human of ordinary strength. To facilitate such transport, the air compressor assembly 10 may have a handle 10H.

Handle 10H may be connected to a housing 10HH that at least partially encloses the motor and/or compressor 12.

A roll cage 15 may be connected to the housing 10HH and surrounds air storage tank 14. Preferably roll cage 15 protects portions of air storage tanks 14 from receiving impacts. Roll cage 15 may be directly attached to housing 10HH and/or tank 14.

A discharge port 11 is connected to the air storage tank 14 to which a pressure manifold or pipe is fitted allowing compressed air to be drawn from the tank 14 for powering air powered tools such as nailing tools, socket driving tools, material shaping tools, sanding tools, spray painting tools, and tire inflation chucks.

A pressure switch assembly 13 inside of the compressor 12 may connected to motor 105 for regulating pressure within the air storage tank 14 by alternately starting and stopping the compressor 12 to periodically replenish the supply of air in the tank 14. When pressure within the tank 14 reaches a preset low pressure point, or "kick-in pressure," the pressure switch assembly 13 starts the compressor 12 to re-pressurize the tank 14. As the pressure within the tank 14 reaches a preset high pressure point, or "kick-out pressure," the pressure switch assembly 13 stops the compressor 12 to prevent over-pressurization of the tank 14. In this manner, the pressure of the compressed air in the compressed air storage tank 14 is maintained within a range generally suitable for powering one or more air powered tools.

Persons skilled in the art shall recognize that pressure switch assembly 13 may be connected to controller circuit 110 (further described below), so that controller circuit 110 can receive the data from pressure switch assembly 13 and control the operation of motor 105 (and thus pump 104).

A tank gauge 16 can show the pressure within tank 14. A regulator 17 can be disposed between discharge port 11, tank 14 and/or tank gauge 16 for controlling the output air pressure at discharge port 11.

Persons skilled in the art will recognize that an output gauge (not shown) may be provided between regulator 17 and discharge port 11 to show the output air pressure. The need for such output gauge may be minimized if the regulator 17 is calibrated and indicia 171 are provided so that the user knows the expected air pressure from the position of the knob 17K of regulator 17. Indicia 171 may be hot-stamped or embossed unto housing 10HH.

Preferably the knob 17K is rotatable less than 360 degrees throughout the entire pressure range, e.g. from 0 psi to 150 psi, or from about 70 psi to about 135 psi. Knob 17K may be threadingly engaged to a housing. The thread pitch is preferably between 4-6 mm.

Referring to FIG. 3, an electrical system is preferably included in the air compressor assembly 10. The electrical system may include a battery pack docking station 106 for receiving a battery pack 107. Battery pack 107 is preferably a power tool battery pack having a nominal voltage of at least about 18-20 volts, and preferably about 60 volts. Persons skilled in the art are referred to U.S. Pat. Nos. 7,618,741 and 6,304,058, which are hereby fully incorporated by reference, for further reference on battery pack 107 and its connection to battery pack docking station 106.

Persons skilled in the art shall recognize that different power tool battery packs 107 with different characteristics may be connectable to battery pack docking station 106. For example, battery pack docking station 106 may receive (and compressor 12 may be operable) when a user connects a first power tool battery pack 107A that has a nominal voltage of at least about 18-20 volts. Similarly battery pack docking station 106 may also receive (and compressor 12 may be operable) when a user connects a second power tool battery pack 107B that has a nominal voltage of about 60 volts. Persons skilled in the art shall recognize that air compressor assembly 10 may have a step-down power converter to lower the nominal voltage of the second power tool battery pack 107B to a particular voltage, as disclosed in U.S. Pat. No. 6,308,059, which is wholly incorporated by reference.

First and second power tool battery packs 107A, 107B may also differ in other characteristics, such as battery cell chemistry, cell connection configuration, etc. For example, first power tool battery pack 107A may have a strand with a certain number of cells connected in series, while the second power tool battery pack 107B may have two strands of cells, each strand having the same number of cells connected in series, while both strands are connected in parallel in order to increase the overall capacity (measured in amp-hours) of the second power tool battery pack 107B. Alternatively, first and second power tool battery packs 107A, 107B may have different types of cells with different capacities, sizes, etc.

Second power tool battery pack 107B may also be a convertible battery pack where in a first configuration both strands are connected in series (increasing the overall voltage of the battery pack) while, in a second configuration, both strands are connected in parallel. Persons skilled in the art are referred to U.S. Pat. No. 10,608,574, issued on Mar. 31, 2020, entitled "Convertible Battery Pack", which is fully incorporated herein by reference, for further information on alternate cell configurations and battery pack capabilities.

Compressor 12 may have a controller circuit 110 for identifying the type of power tool battery pack 107 connected to battery pack docking station 106. For example, first and second power tool battery packs 107A, 107B may have an identifying feature 107ID, such as an ID resistor, an ID capacitor, an ID number stored in a memory of battery pack 107, etc. Persons skilled in the art are referred to U.S. Pat. Nos. 5,945,803 and 6,175,211, which are wholly incorporated by reference, for further information on possible configurations for such identifying features 107ID. Upon connecting power tool battery pack 107 to battery pack docking station 106, controller circuit 110 would detect identifying feature 107ID (or query the battery pack 107) to determine the type of battery pack and/or its characteristics, so that controller 107 can then control motor 105 in an advantageous manner, further described below.

Battery pack docking station 106 may be connected to a charger circuit 108, which in turn is connected to an AC power source via power cord 109. With such charger circuit 108, battery pack 107 may be charged while connected to the battery pack docking station 106.

Motor 105 preferably receives power from the battery pack 107 connected to the battery pack docking station 106. Persons skilled in the art will recognize that motor 105 may also receive power from charger circuit 108 and/or power cord 109, allowing a user to use air compressor assembly 10, even if the battery pack 107 is fully discharged or not available.

Persons skilled in the art will recognize that air compressor assembly 10 may have multiple battery pack docking stations in the electrical system. In embodiments where multiple docking stations are utilized, the compressor electrical system may be constructed so as to draw electricity from battery packs 107 (received in the docking stations) in parallel, or concurrently such as when power is unavailable from a conventional power source (e.g. a commercially available alternating current source). In additional embodiments, a user operated switch may be included to allow the user to select from which battery/docking station power is to be drawn. Alternatively, an automatic switch may be included to switch from a first battery/docking station to second docking station based on a removable battery's available power, if a battery is coupled to the docking station, and the like.

Battery run-time may be extended by turning on pump 104 only when the pressure within the tank 14 reaches a preset low pressure point and turning off pump 104 when pressure within the tank 14 reaches a preset high pressure point, as well by selecting a pump 104 that does not draw too much current from the battery pack 107. With the present arrangement, it is preferable to select a pump 104 that takes less than 30 seconds (and preferably around 26 seconds or less) to raise the pressure from tank 14 from a preset low pressure point of 105 psi to a preset high pressure point of 135 psi.

By extending battery run-time, a larger number of nails may be driven by a nail gun powered by air compressor assembly 10. For example, with the air compressor assembly 10 described in the present specification having a tank pressure of 135 psi can power an 18 gauge finish nailer to drive up to 1220 nails on a single battery charge at a 70 psi setting.

It may be preferable to provide pressure switch assembly 13 with multiple pressure switches that can be triggered at different air tank pressures. Controller circuit 110 would receive the information as to the status of the pressure switch(es), i.e., whether pressure switches are closed or opened. Because controller circuit 110 has recognized the type of power tool battery pack 107 connected to compressor 12, it can control motor 105 in an advantageous manner as discussed below.

In an exemplary execution, pressure switch assembly 13 preferably has two mechanical pressure switches 13A, 13B, which close at 125 PSI and 140 PSI, respectively. As described as one of the embodiments above, first power tool battery pack 107A has a single cell strand while the second power tool battery pack 107B has two cell strands connected in parallel. Accordingly, the first power tool battery pack 107A has a lower capacity (in amp-hours) than the second power tool battery pack 107B.

With such arrangement, controller circuit 110 can control motor 105 differently in response to the characteristics of the second power tool battery pack 107B. When the first power tool battery pack 107A is connected to compressor 12 and pressure within the tank 14 reaches a preset low pressure point, or "kick-in pressure," where both pressure switches 13A, 13B are closed, controller circuit 110 starts motor 105 to re-pressurize the tank 14. As the pressure within the tank 14 reaches a particular pressure point, at least one of the pressure switches 13A, 13B will open. (Persons skilled in the art shall recognize that probably pressure switch 13A will open first, but to ensure that the logic algorithm carried out by controller circuit 110 does not result in an error, controller circuit 110 is programmed to stop motor 105 when either pressure switch 13A, 13B is open.)

However, if controller circuit 110 detects that the higher capacity second power tool battery pack 107B is connected to compressor 12, controller circuit 110 can control motor 105 differently. As before, when the second power tool battery pack 107B is connected to compressor 12 and pressure within the tank 14 reaches the preset low pressure point, or "kick-in pressure," where both pressure switches 13A, 13B are closed, controller circuit 110 starts motor 105 to re-pressurize the tank 14. As the pressure within the tank 14 reaches a particular high pressure point, at least one of the pressure switches 13A, 13B will open. However, controller circuit 110 will not stop the motor 105 (and allow the tank pressure to continue rising) until both pressure switches 13A, 13B are open.

Persons skilled in the art shall recognize that, when both pressure switches 13A, 13B open, the tank pressure will be higher than when only one of the pressure switches open. This is advantageous as it allows compressor 12 to power the air powered tools for a longer time before having to repressurize tank 14.

Controller circuit 110 may be programmed to follow a more complex logic. For example, controller circuit 110 may be programmed so that, at start-up, the controller circuit 110 may run motor 105 as long as one of pressure switches 13A, 13B is open, and stop when both pressure switches 13A, 13B are open when the second power tool battery pack 107B is connected to compressor 12.

However, at states other than start-up, when only one of pressure switches 13A, 13B is open, the controller circuit 110 will continue the behaviour of the previous state. Accordingly, if motor 105 was running before one of the pressure switches 13A, 13B is open, the controller circuit 110 will continue to run motor 105. On the other hand, if motor 105 was not running when one of the pressure switches 13A, 13B opened, the controller circuit 110 will not motor 105.

Persons skilled in the art shall recognize that pressure switch assembly 13 may have at least one pressure sensor 13C instead of pressure switches 13A, 13B. Pressure sensor (s) 13C will provide an analog signal representative of the pressure within tank 14. Controller circuit 110 can receive and use such analog signal to determine when to turn on and off motor 105.

It is believed that the apparatus of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A cordless compressor comprising:
an air storage tank;
a pump for pressuring air within the air storage tank;
a motor for driving the pump;
a battery pack docking station electrically connected to the motor, wherein a power tool battery pack is electrically connectable to the battery pack docking station;
a controller circuit electrically connected to the motor, wherein the controller identifies a component within the power tool battery pack to determine a maximum capacity characteristic of the power tool battery pack;
a pressure switch assembly connected to the controller circuit, wherein the pressure switch assembly has first and second pressure switches for sensing pressure within the air storage tank;
a discharge port connected to the air storage tank; and
a regulator disposed between the discharge port and the air storage tank;
wherein the controller circuit controls de-activation of the motor depending upon status of the first and second pressure switches and the determined maximum capacity characteristic of the power tool battery pack.

2. The cordless compressor of claim 1, wherein the controller circuit controls de-activation of the motor depending upon the status of the first and second pressure switches and the determined characteristic of the power tool battery pack.

3. The cordless compressor of claim 1, further comprising an AC power cord for connecting the motor to an AC power source.

4. A cordless compressor comprising:
an air storage tank;
a pump for pressuring air within the air storage tank;
a motor for driving the pump;

a battery pack docking station electrically connected to the motor, wherein a power tool battery pack is electrically connectable to the battery pack docking station;

a controller circuit electrically connected to the motor, the controller circuit determining a maximum capacity characteristic of the power tool battery pack electrically connected to the battery pack docking station;

a pressure sensor connected to the controller circuit for sensing pressure within the air storage tank;

a discharge port connected to the air storage tank; and a regulator disposed between the discharge port and the air storage tank;

wherein the controller circuit controls de-activation of the motor depending upon the pressure sensed by the pressure sensor and the determined maximum capacity characteristic of the power tool battery pack.

5. The cordless compressor of claim 4, further comprising an AC power cord for connecting the motor to an AC power source.

* * * * *